United States Patent
Dang et al.

(10) Patent No.: US 10,914,813 B2
(45) Date of Patent: Feb. 9, 2021

(54) CLASSIFYING POTENTIALLY STATIONARY OBJECTS TRACKED BY RADAR

(71) Applicant: APTIV TECHNOLOGIES LIMITED, St. Michael (BB)

(72) Inventors: Wenbing Dang, North Hollywood, CA (US); Jan K. Schiffmann, Newbury Park, CA (US); Kumar Vishwajeet, Pasadena, CA (US); Keerthi Raj Nagaraja, San Francisco, CA (US); Franz P. Schiffmann, Port Hueneme, CA (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 172 days.

(21) Appl. No.: 16/106,308

(22) Filed: Aug. 21, 2018

(65) Prior Publication Data

US 2020/0064436 A1    Feb. 27, 2020

(51) Int. Cl.
G01S 5/02    (2010.01)
B60W 40/04   (2006.01)

(52) U.S. Cl.
CPC ........... *G01S 5/0294* (2013.01); *B60W 40/04* (2013.01); *G01S 5/0247* (2013.01); *G01S 5/0278* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,345,437 | B1* | 7/2019 | Russell | B60W 30/0956 |
| 2006/0080011 | A1* | 4/2006 | Gaboury | G01S 7/4004 |
| | | | | 701/29.7 |
| 2008/0172156 | A1* | 7/2008 | Joh | G01S 13/931 |
| | | | | 701/45 |
| 2009/0192710 | A1* | 7/2009 | Eidehall | B62D 15/0265 |
| | | | | 701/301 |
| 2009/0278672 | A1* | 11/2009 | Weilkes | B60W 50/14 |
| | | | | 340/435 |
| 2011/0282581 | A1* | 11/2011 | Zeng | G01S 7/4808 |
| | | | | 701/301 |
| 2013/0222589 | A1* | 8/2013 | Lalonde | G06T 7/579 |
| | | | | 348/148 |
| 2014/0049419 | A1* | 2/2014 | Lehning | G01S 13/589 |
| | | | | 342/107 |
| 2014/0207374 | A1* | 7/2014 | Taylor, Jr. | G01C 21/206 |
| | | | | 701/470 |

(Continued)

OTHER PUBLICATIONS

Darms M S et al: "Obstacle Detection and Tracking for the Urban Challenge", vol. 10, No. 3, Sep. 1, 2009., pp. 475-485.

(Continued)

*Primary Examiner* — Mamadou L Diallo
(74) *Attorney, Agent, or Firm* — Carlson, Gaskey & Olds, P.C.

(57) ABSTRACT

An illustrative example method of tracking a detected object comprises determining that a tracked object is near a host vehicle, determining an estimated velocity of the tracked object, and classifying the tracked object as frozen relative to stationary ground when the estimated velocity is below a preselected object threshold and a speed of the host vehicle is below a preselected host threshold.

20 Claims, 2 Drawing Sheets

(56) References Cited

U.S. PATENT DOCUMENTS

2015/0198711 A1\* 7/2015 Zeng ................ G01S 13/726
                                                    342/59
2015/0293216 A1\* 10/2015 O'Dea ................ G01S 13/87
                                                    701/23
2019/0323852 A1\* 10/2019 Ondruska .......... G06K 9/00771

OTHER PUBLICATIONS

Kaempchen N et al: "IMM object tracking for high dynamic driving maneuvers", Jun. 14-17, 2004, pp. 825-830.
Steyer Sascha et al: "Object tracking based on evidential dynamic occupancy grids in urban environments", Jun. 11, 2017, pp. 1064-1070.
European Search Report for Application No. 19186755, European Patent Office, dated Jan. 10, 2020.

\* cited by examiner

CLASSIFYING POTENTIALLY STATIONARY OBJECTS TRACKED BY RADAR

BACKGROUND

Modern day vehicles include a variety of sensors and detectors that provide information regarding the environment or vicinity around a vehicle. For example, radar tracking devices may provide information regarding objects in a vicinity or pathway of a vehicle. Such information is useful for driver assistance features. In some cases, automated or semi-automated vehicle operation is possible based on such information. For example, adaptive cruise control and parking assist features are known that automatically control speed or movement of a vehicle based on such sensor input. Autonomous or automated vehicles that are self-driving may utilize such information.

While radar and other sensor devices have proven useful, there are limitations on the type or accuracy of information available from them. For example, sensors have limitations at lower speeds, particularly when there is little relative motion between the sensor and a tracked object. When an object and the host vehicle are moving at low speeds or are stationary, the detections from the radar device may be ambiguous. Over time, the radar detections on such an object can vary randomly, causing false motion of the object.

SUMMARY

An illustrative example method of tracking a detected object comprises determining that a tracked object is near a host vehicle, determining an estimated velocity of the tracked object, and classifying the tracked object as frozen relative to stationary ground when the estimated velocity is below a preselected object threshold and a speed of the host vehicle is below a preselected host threshold.

An illustrative example system for tracking a detected object includes a tracking device configured to detect an object and a processor. The processor is configured to determine that a tracked object is near a host vehicle, determine an estimated velocity of the tracked object, and classify the tracked object as frozen relative to stationary ground when the estimated velocity is below a preselected object threshold and a speed of the host vehicle is below a preselected host threshold.

The various features and advantages of at least one disclosed example embodiment will become apparent to those skilled in the art from the following detailed description. The drawings that accompany the detailed description can be briefly described as follows.

DETAILED DESCRIPTION

Figure 1:
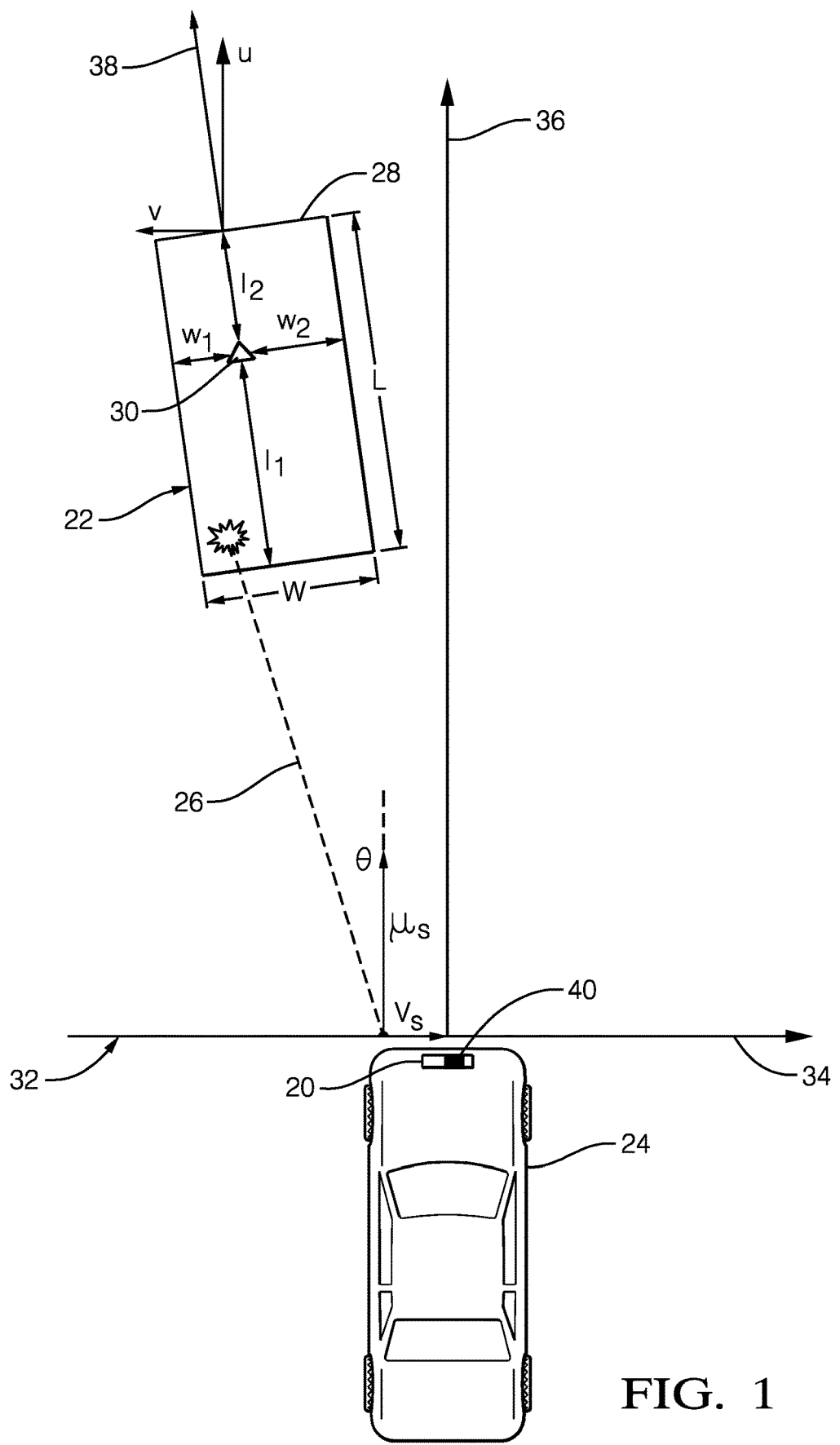
FIG. 1 diagrammatically illustrates an example use of a system for tracking a detected object according to an embodiment of this invention.

FIG. 1 diagrammatically illustrates a system 20 for tracking an object 22. In this example, the system 20 comprises a tracking device 40 situated on a host vehicle 24. In one embodiment, the host vehicle 24 is an autonomous or semi-autonomous vehicle. The system 20 determines information about the object 22, and continuously updates the information about the object 22 over time. The system 20 may "freeze," or stop updating, certain information about the object 22 when particular conditions are met in order to maintain accurate information about the object 22.

The system 20 uses known radar signaling as schematically shown at 26 for detecting several characteristics of the object 22. In an example, the system 20 includes four short range radar detectors, and a forward looking radar detector. The system 20 determines characteristics of the object 22 based on the detections it receives and any known information, such as the position and speed of the system 20.

The object 22 may be represented using a bounding box 28 having a centroid 30. Tracking in two dimensions allows the object 22 to be represented by a rectangular bounding box 28. There are known tracking techniques for determining a bounding box 28 corresponding to the edges of the object 22 and for locating the centroid 30 within that bounding box 28. The bounding box 28 is parameterized by a length L and a width W. The dimensions $l_1$, $l_2$, $w_1$, and $w_2$ indicate the position of the centroid 30 relative to the edges of the body of the object 22. The length L of the bounding box 28 is equal to the sum of $l_1$ and $l_2$ and the width W is equal to the sum of $w_1$ and $w_2$.

The host vehicle 24 has its own host vehicle coordinate system 32, having a lateral direction 34 and a longitudinal direction 36 relative to the host vehicle 24. The vehicle coordinate system 32 is positioned in a world coordinate system, which represents stationary ground. Each of the detections of the system 20 is in a frame of reference. The radar detectors of the system 20 each have a mounting position and boresight angle that are known with respect to the vehicle coordinate system 32. Generally, every detection generated by the system 20 can be characterized by a range (R), a range rate ($\dot{R}$), and azimuth ($\Theta$). The speed of the host vehicle 24, its orientation in the world, and the parameters in the radar frame of reference are used to compute a compensated range rate $\dot{R}_c$ for each detection. The compensated range rate $\dot{R}_c$ is a radial component of an over-the-ground velocity of the object 22.

Figure 2:
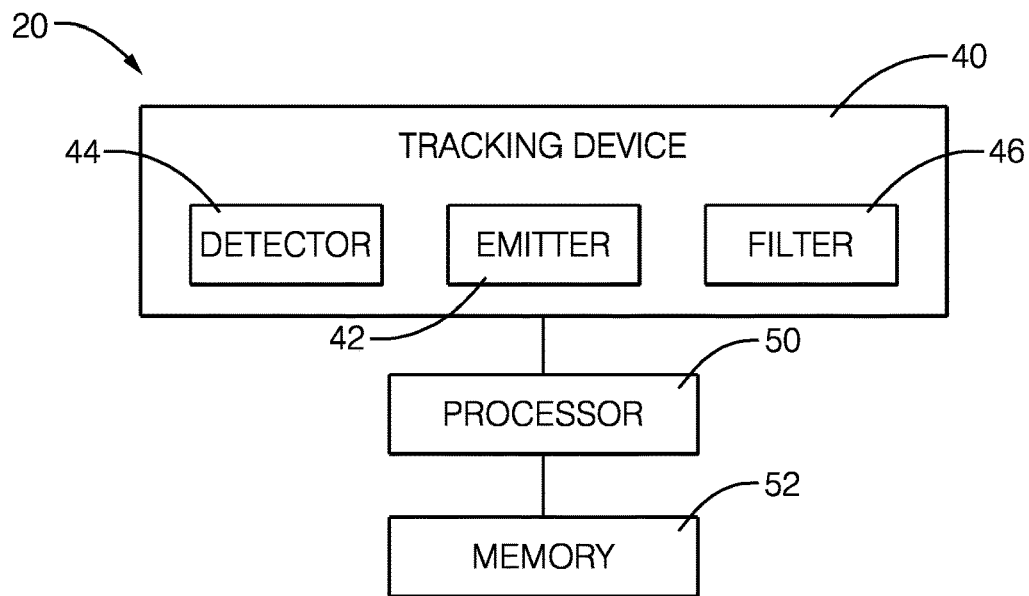
FIG. 2 schematically illustrates selected portions of an example embodiment of a system for tracking an object designed according to an embodiment of this invention.

FIG. 2 schematically illustrates selected portions of the system 20. A tracking device 40 includes an emitter 42 and detector 44. The emitter 42 emits radiation in an outward direction and, when such radiation reflects off of an object (e.g., the object 22), that reflected radiation is received and detected by the detector 44. In some example embodiments, the emitter 42 and detector 44 operate according to known radar principles and techniques. Other embodiments include emitter and detector configurations that are useful for lidar or ultrasonic detection techniques.

The tracking device 40 includes a filter 46 that is configured for estimating dynamic quantities of a tracked object 22. In some example embodiments, the filter 46 operates according to known principles of Kalman filters. A Kalman filter may estimate the position, heading angle, speed, curvature, acceleration, and yaw rate of the object 22, for example. These quantities are referred to as the object's state variables. In some embodiments, the filter 46 also estimates a length and width of the object 22.

The system 20 includes a processor 50, which may be a dedicated microprocessor or a portion of another computing device supported on the vehicle 24. Memory 52 is associated with the processor 50. In some example embodiments, the memory 52 includes computer-executable instructions that cause the processor 50 to operate for purposes of tracking a moving object and determining the pointing angle or body orientation angle of that object. In some example embodiments, the memory 52 at least temporarily contains information regarding various features or characteristics of a tracked object to facilitate the processor 50 making desired determinations regarding the pointing angle of such an object.

The tracking filter 46 may provide an indication of the velocity vector 38 of the object 22, as shown in FIG. 1. The velocity vector 38 is expressed in terms of a Cartesian coordinate system, such as the vehicle coordinate system 32. In another embodiment, the velocity vector 38 could be expressed in terms of the world coordinate system. In some cases, the world coordinate system and the vehicle coordinate system 32 are the same while in others there is a known relationship between those coordinate systems. In the illustrated example, longitudinal and lateral components u, v of the velocity vector 38 are relative to the vehicle coordinate system 32.

The tracking device 40 periodically updates and stores information about the object 22. In one embodiment, the tracking filter 46 updates the object's state variables several times per second. In a further embodiment, the tracking device 40 updates the object's state variables more than 100 times per second. The tracking device 40 predicts measurements at a particular time interval, then receives data from the detector 44, and compares the predicted values with the measured values. The filter 46 generates a correction based on the difference between the predicted values and the measured values, and corrects the state variables based on the correction.

At each time interval, the filter 46 predicts the object's state variables, then receives measurements of the object's state variables. The filter 46 compares the predicted state variables to the measured state variables and determines a correction to the state variables. In some embodiments, a length and width filter estimates an updated length and width of the object 22 at each time step.

For stationary objects, radar sensors generate very few useful radar detections, and thus state variable estimates may have a large error. This is particularly true where both the object 22 and the host vehicle 24 are stationary. Many radar scatters can fall within the same range-Doppler bin, and the algorithms often used for determining the angles can resolve only a few angles in the same range-Doppler bin. Over time, the position of the detections can randomly vary on the object 22, which may cause the tracking system 20 to incorrectly detect motion of the object 22.

Figure 3:
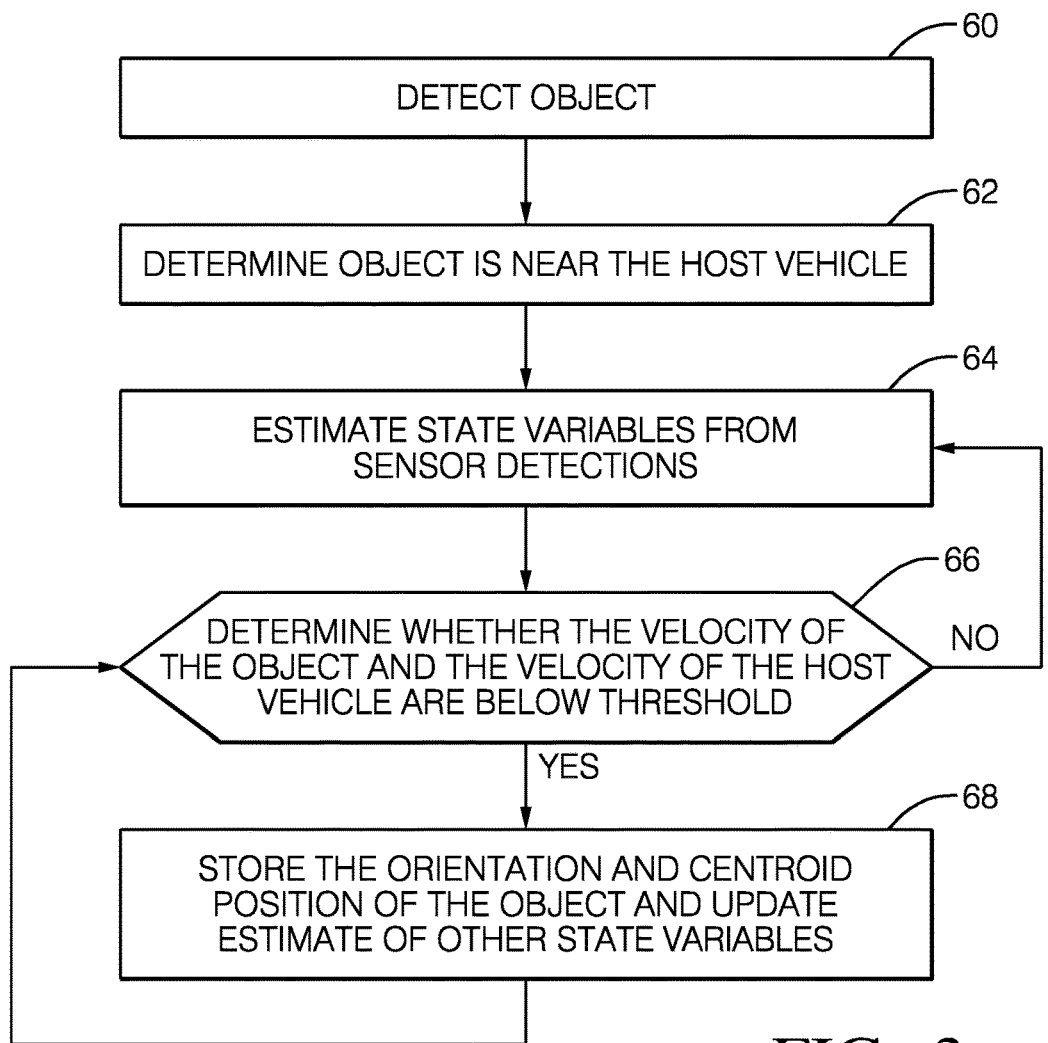
FIG. 3 is a flowchart diagram summarizing an example method of classifying a stationary or slowly moving object.

FIG. 3 summarizes an example method to help prevent the system 20 from detecting false motion of the object 22. After an object 22 is detected at 60, the processor 50 determines that the object 22 is near the host vehicle 24 at 62. In one example, near the host vehicle 24 means that it is within the width of the road on which the host vehicle 24 is located. For example, in the United States, a standard road lane is 3.7 meters, and thus two lane widths is about 7 meters. In one example, the processor 50 determines that the object 22 is near the host vehicle 24 if it is within about 10 meters of the host vehicle 24. In other examples, near the host vehicle 24 may mean less than about 10 meters or more than about 10 meters. The processor 50 may determine whether the object 22 is near the host vehicle 24 by creating a rectangular region around the host vehicle 24 and determining whether the centroid 30 of the object 22 is within that rectangular region.

The processor 50 and filter 46 estimate the object's state variables at 64 based on the detections at the detector 44. In some embodiments, the determination and estimate at 62 and 64 may be done in reverse order or simultaneously.

The processor 50 then determines whether the speed of the host vehicle 24 is below a preselected host threshold and a speed of the object 22 is below a preselected object threshold at 66. In one example, the preselected host threshold is selected to correspond to the host vehicle 24 stopping or remaining stationary at a traffic light. In one example, the preselected object threshold is selected to indicate that the tracked object 22 is stopped or stopping at a traffic light. If these conditions are not met, the processor 50 continues to update the object's state variables at 64. Once the processor 50 has determined that the conditions at 66 are satisfied, the processor 50 classifies the tracked object 22 as stationary and "freezes" a position of the object 22 relative to the host vehicle 24 or stationary ground at 68. In this disclosure, the terms "frozen" or "freezing" correspond to the object 22 being stationary. In one example embodiment, this "freezing" comprises setting a freeze flag as TRUE, and when the object is not frozen, the freeze flag is set to FALSE. This freezing of the object's position prevents the system 20 from detecting false motion due to the scattered detections when both the host vehicle 24 and the object 22 are stationary.

When the tracked object 22 is classified as "frozen," the processor 50 stores some of the object's state variables, while the filter 46 continues to periodically update other state variables, such as the object's speed, curvature, and yaw rate. In one embodiment, the position and orientation of the object are stored and not updated while the object is "frozen." In some embodiments, the lengths $l_1$, $l_2$ and widths $w_1$, $w_2$ will not be updated while the freeze flag is set to TRUE.

Once either the speed of the host vehicle 24 exceeds the preselected host threshold or the velocity of the object 22 exceeds the preselected object threshold, the position of the object 22 will be unfrozen, or the freeze flag will be switched to FALSE. When the position of the object 22 is unfrozen, the system 20 resumes updating all of the object's state variables periodically, including the position and orientation of the object 22 at 64.

In some examples, this approach is only used for objects 22 that have a velocity component (shown at u in FIG. 1) that is parallel to the host vehicle 24, or has a large component u in the longitudinal direction 36. Objects 22 that do not have sufficient motion in the longitudinal direction 36 relative to the host vehicle 24 are difficult for the system 20 to determine when to switch the freeze flag to FALSE.

To determine when the object 22 is moving again and thus classify the object 22 as not frozen, the tracking device 40 uses range rates from the associated detections. The tracking device 40 checks whether there are sufficient detections associated with the object 22 whose azimuth Θ has an absolute value of cosine that is above a preselected threshold. If there are sufficient detections that meet this criterion, then the processor 50 calculates the compensated range rate, as shown below.

In general, the raw range rate $\dot{r}$ from a radar detection can be modeled as:

$$\dot{r} = (u - u_s)\cos(\Theta) + (v - v_s)\sin(\Theta)$$

where u and v are longitudinal and lateral velocities of the object 22, and $u_s$ and $v_s$ are the longitudinal and lateral velocities of the sensor system 20. In an example embodiment, the velocities u, v, $u_s$, $v_s$ are over the ground velocities in the vehicle coordinate system 32. The angle Θ is the azimuth angle of the detection in the vehicle coordinate system 32. This equation can be rearranged to derive the compensated range rate as the object velocity projected onto the radial direction:

$$\dot{r}_{comp} = \dot{r} + u_s \cos(\theta) + v_s \sin(\theta) = u \cos(\theta) + v \sin(\theta)$$

where the sensor velocities $u_s$ and $v_s$ can be derived by using the measured speed of the vehicle 24 and yaw rate signals as well as the sensor mounting location on the host vehicle 24. Assuming that the over the ground lateral velocity v is less than a preselected threshold $v_{max}$ and that the cosine of $\Theta$ is positive, it follows that:

$$u \in \left[ \frac{\dot{r}_{comp}}{\cos(\theta)} - v_{max} |\tan(\theta)|, \frac{\dot{r}_{comp}}{\cos(\theta)} + v_{max} |\tan(\theta)| \right] \triangleq [u_-, u_+]$$

where cosine of $\Theta$ is above the preselected threshold, as noted above. An absolute value of the velocity u must be less than a preselected threshold velocity $u_{max}$ for the object to be classified stationary and thus frozen. When the velocity u exceeds the threshold velocity $u_{max}$, the object 22 is moving.

If there are not sufficient detections that meet the criterion requiring cosine of $\Theta$ be above a threshold, then the processor 50 determines the sensor velocities $u_s$, $v_s$ by comparing the compensated range rate to a threshold. If the biggest absolute value of compensated range rate $\dot{r}_{comp}$ of associated detections of the object 22 exceeds a preselected threshold $s_{max}$, then the object is classified as moving, and the system 20 treats the object 22 as unfrozen.

When the object 22 is not frozen, all of the object's state variables may be updated at every time step. The system 20 continually emits radiation, detects reflected radiation, and estimates values based on those detections. The processor 50 may repeat many of the steps represented in FIG. 3 in an iterative fashion while the host vehicle 24 is in operation or in some embodiments, only when the host vehicle 24 is travelling at speeds below the preselected host speed threshold.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of tracking a detected object, the method comprising:
   determining that a tracked object is near a host vehicle;
   determining an estimated velocity of the tracked object;
   classifying the tracked object as frozen relative to stationary ground when the estimated velocity is below a preselected object threshold and a speed of the host vehicle is below a preselected host threshold, wherein when the tracked object is classified as frozen, periodically updating an estimate of speed, curvature, and yaw rate for the tracked object; and
   classifying the tracked object as not frozen when the speed of the host vehicle exceeds the preselected host threshold or the estimated velocity of the tracked object exceeds the preselected object threshold.

2. The method of claim 1, wherein classifying the tracked object as frozen comprises freezing a determined orientation, length, width, and centroid position of the tracked object with respect to stationary ground.

3. The method of claim 1, comprising estimating the speed, curvature, yaw rate, and position of the object using a Kalman filter.

4. The method of claim 1, wherein the object is a second vehicle.

5. The method of claim 4, wherein the second vehicle is oriented in a direction parallel to the host vehicle.

6. The method of claim 1, wherein the estimated velocity of the object is an over the ground velocity.

7. The method of claim 1, wherein the estimated velocity of the object is a velocity relative to the host vehicle.

8. The method of claim 1, wherein the preselected host threshold is equal to the preselected object threshold.

9. The method of claim 1, wherein when the tracked object is classified as frozen, a position and orientation of the tracked object are stored and not updated.

10. The method of claim 4, wherein the preselected object threshold is selected to indicate that the tracked object is stopped.

11. The method of claim 10, wherein the preselected host threshold is selected to indicate that the host vehicle is stopped.

12. A system for tracking a detected object, the system comprising:
   a tracking device configured to detect an object; and
   a processor configured to:
      determine that the tracked object is near a host vehicle;
      determine an estimated velocity of the tracked object;
      classify the tracked object as frozen relative to stationary ground when the estimated velocity is below a preselected object threshold and a speed of the host vehicle is below a preselected host threshold, wherein the processor is configured to periodically update an estimate of speed, curvature, and yaw rate for the tracked object when the tracked object is classified as frozen; and
   classifying the tracked object as not frozen when the speed of the host vehicle exceeds the preselected host threshold or the estimated velocity of the tracked object exceeds the preselected object threshold.

13. The system of claim 12, wherein the processor is configured to freeze a determined orientation, length, width, and centroid position of the tracked object with respect to stationary ground.

14. The system of claim 12, wherein the processor is configured to estimate the speed, curvature, yaw rate, and position of the object using a Kalman filter.

15. The system of claim 12, wherein the object is a second vehicle.

16. The system of claim 15, wherein the second vehicle is oriented in a direction parallel to the host vehicle.

17. The system of claim 12, wherein the estimated velocity of the object is an over the ground velocity.

18. The system of claim 12, wherein the estimated velocity of the object is a velocity relative to the host vehicle.

19. The system of claim 12, wherein the preselected host threshold is equal to the preselected object threshold.

20. The system of claim 15, wherein the preselected object threshold is selected to indicate that the tracked object is stopped and the preselected host threshold is selected to indicate that the host vehicle is stopped.

* * * * *